US010321276B2

(12) United States Patent
Chiang et al.

(10) Patent No.: US 10,321,276 B2
(45) Date of Patent: Jun. 11, 2019

(54) SYSTEMS AND METHODS FOR VEHICLE TELEMATICS REGISTRATION

(71) Applicant: Toyota Connected North America, Inc., Plano, TX (US)

(72) Inventors: Kevin Chiang, Frisco, TX (US); David Tsai, Irvine, CA (US); Preston Doster, Frisco, TX (US); Ali Kazmi, Tustin, CA (US)

(73) Assignee: Toyota Connected North America, Inc., Plano, TX (US)

( * ) Notice: Subject to any disclaimer, the term of this patent is extended or adjusted under 35 U.S.C. 154(b) by 0 days.

(21) Appl. No.: 15/815,131

(22) Filed: Nov. 16, 2017

(65) Prior Publication Data
US 2019/0149956 A1    May 16, 2019

(51) Int. Cl.
| H04W 4/00 | (2018.01) |
| G07C 5/00 | (2006.01) |
| H04W 60/00 | (2009.01) |
| H04W 4/04 | (2009.01) |
| H04L 29/08 | (2006.01) |

(52) U.S. Cl.
CPC ............ *H04W 4/046* (2013.01); *G07C 5/008* (2013.01); *H04L 67/12* (2013.01); *H04W 60/00* (2013.01)

(58) Field of Classification Search
CPC ...... H04W 4/046; H04W 60/00; G07C 5/008; H04L 67/12

USPC .......................................................... 701/36
See application file for complete search history.

(56) References Cited

U.S. PATENT DOCUMENTS

| 9,247,434 | B2 | 1/2016 | Tengler et al. |
| 2006/0100886 | A1 | 5/2006 | Simon |
| 2007/0244628 | A1 | 10/2007 | Rockett et al. |
| 2009/0287499 | A1 | 11/2009 | Link, II |
| 2013/0132286 | A1 | 5/2013 | Schaefer et al. |
| 2015/0382160 | A1* | 12/2015 | Slay, Jr. ................ H04W 4/029 455/466 |
| 2016/0219059 | A1 | 7/2016 | Park |
| 2017/0265022 | A1* | 9/2017 | Lei .......................... H04W 4/80 |
| 2017/0308365 | A1* | 10/2017 | Cermak .................... G06F 8/61 |

* cited by examiner

*Primary Examiner* — Marthe Y Marc-Coleman
(74) *Attorney, Agent, or Firm* — Dinsmore & Shohl LLP

(57) ABSTRACT

Systems and methods for vehicle telematics registration are provided. One embodiment of a method includes receiving a vehicle identifier for a vehicle and a user telephone number for a user from a vehicle head unit, where the vehicle head unit provided a user interface requesting the user telephone number. Similarly, some embodiments include populating a portion of a registration form for a telematics service with the vehicle identifier and the user telephone number, creating a link to the registration form, and inserting the link into an electronic message to the user telephone number. Still some embodiments include sending the electronic message to the user telephone number and registering, by the computing device, the vehicle for the telematics service in response to the user selecting the link and submitting the registration form.

20 Claims, 8 Drawing Sheets

SYSTEMS AND METHODS FOR VEHICLE TELEMATICS REGISTRATION

TECHNICAL FIELD

Embodiments described herein generally relate to systems and methods for vehicle telematics registration and, more specifically, to embodiments that utilize a vehicle interface for registering a vehicle owner for a telematics service.

BACKGROUND

Many current vehicles provide one or more telematics services, such as crash notification, live navigation, and the like. While many vehicle users wish to obtain these services, oftentimes vehicle users do not realize that registration is a prerequisite for using the services and/or find the registration process too difficult.

Specifically, current solutions force a user to call a call center, work with a vehicle dealer, or find the online portal to register their account and vehicle. Because this process is not especially easy for the customer, many customers do not register and thus do not make themselves available for telematics services.

SUMMARY

Systems and methods for vehicle telematics registration are described. One embodiment of a method includes receiving a vehicle identifier for a vehicle and a user telephone number for a user from a vehicle head unit, where the vehicle head unit provided a user interface requesting the user telephone number. Similarly, some embodiments include populating a portion of a registration form for a telematics service with the vehicle identifier and the user telephone number, creating a link to the registration form, and inserting the link into an electronic message to the user telephone number. Still some embodiments include sending the electronic message to the user telephone number and registering, by the computing device, the vehicle for the telematics service in response to the user selecting the link and submitting the registration form.

In another embodiment, a system for vehicle telematics registration includes a remote computing device that includes a memory component that stores logic that, when executed by the remote computing device, causes the system to receive a vehicle identifier for a vehicle and a user address of a user from a vehicle head unit, determine, from the user address, whether the user has previously registered, and in response to a determination that the user has not previously registered, populate a first portion of a registration form for a telematics service with the vehicle identifier and the user address. The logic may be configured to populate, in response to a determination that the user has previously registered, the first portion of the registration form with the vehicle identifier and the user address and populate a second portion of the registration form with previously submitted user data. Similarly, some embodiments of the logic causes the system to create a link to the registration form, insert the link into an electronic message to the user address, and send the electronic message to the user address. In some embodiments the logic causes the system to register the vehicle for the telematics service in response to the user selecting the link and submitting the registration form.

In yet another embodiment, a vehicle head unit includes a display device and memory component that stores logic, that when executed by the vehicle head unit causes the vehicle head unit to provide, via the display device, an address user interface with an option for a user to enter a user address, where the user address is associated with a user device of the user. Some embodiments of the logic may cause the vehicle head unit to send the user address and a vehicle identifier of the vehicle to a remote computing device, where in response to receiving the user address and the vehicle identifier, the remote computing device sends an electronic message to the user device, and where the electronic message includes a link for the user to register the vehicle with a telematics service. The logic may also cause the vehicle head unit to receive telematics data from the remote computing device, where the remote computing device sends the telematics data in response to receiving registration data submitted via the user device, and where the telematics data is associated with the telematics service to which the vehicle is registered.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for vehicle telematics registration. Some embodiments include a vehicle head unit that may be configured to provide a user interface that prompts the user for a mobile phone number. In response to receiving the mobile phone number, the vehicle head unit may communicate with a data communications module or other remote computing device that sends an electronic message to a telematics service provider (TSP), which may or may not be part of the same remote computing device, to begin the registration process. The electronic message may include a vehicle identification number (VIN), the phone number, and/or other data acquired by the head unit.

The TSP may receive the message from the vehicle head unit; create a unique URL; and construct an SMS message (or other electronic message) with the unique URL. The URL may be provided via a link to a webpage (or mobile application) that includes a registration form. The registration form may be automatically populated with the mobile phone number and VIN. The SMS message may be sent to the user's mobile phone number.

Upon receiving the SMS message on the mobile device, the user may select the URL. In response, the mobile device may launch a web browser and/or a mobile application, which includes the registration form. As discussed above, the registration form may be prepopulated with the phone number, VIN, and/or other information about the user that the TSP has already acquired. The user may populate any remaining requested information. The user may submit the form and registration is complete. The systems and methods for vehicle telematics registration incorporating the same will be described in more detail, below.

Figure 1:
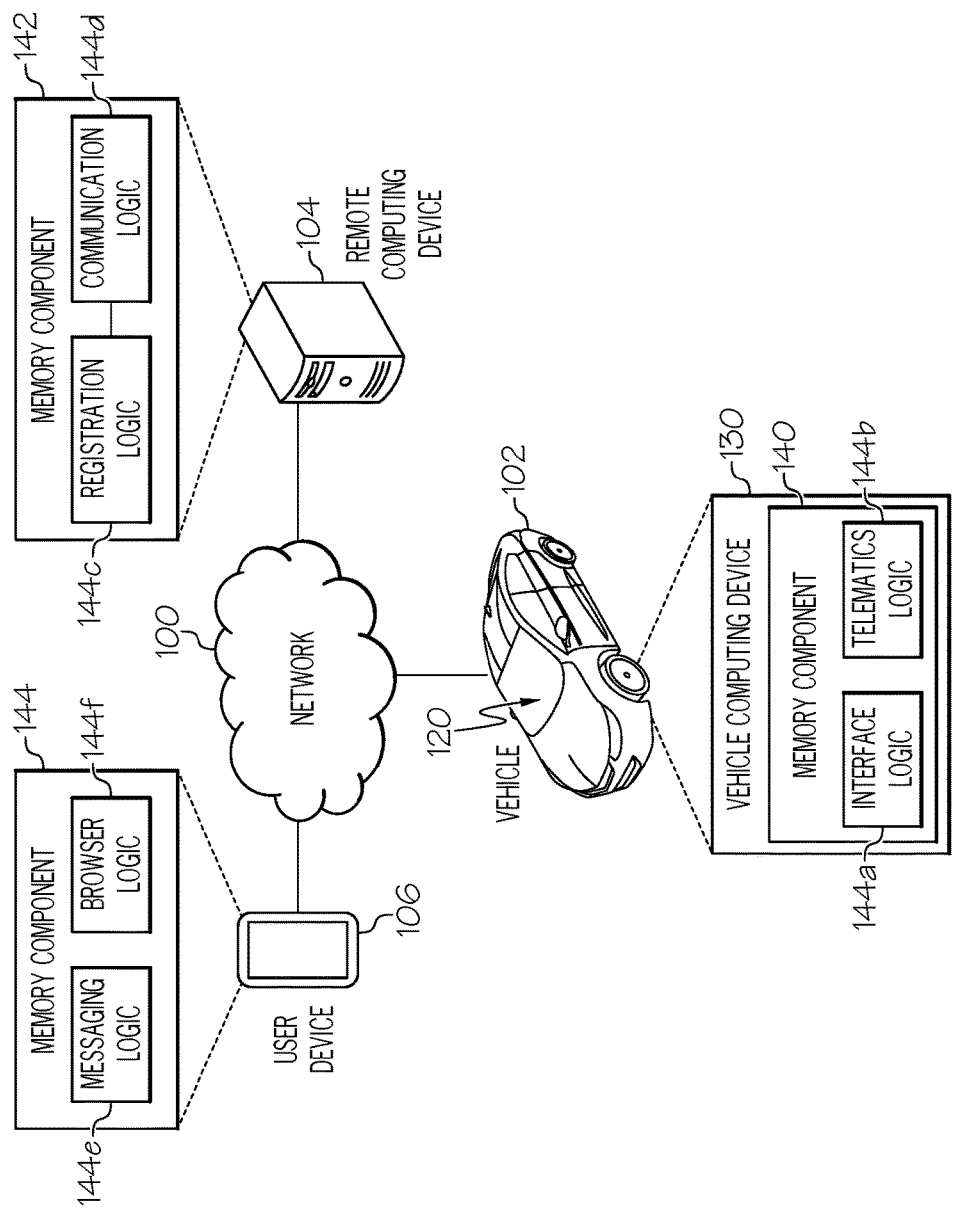
FIG. 1 depicts a computing environment for vehicle telematics registration, according to embodiments described herein.

Referring now to the drawings, FIG. 1 depicts a computing environment for vehicle telematics registration, according to embodiments described herein. As illustrated, the computing environment includes a network 100, which is coupled to a vehicle 102, a remote computing device 104, and a user device 106. The network 100 may include any wide area network (such as the internet, mobile network, cellular network, telephone network, etc.) or local network (such as Wi-Fi, ZigBee, Bluetooth, Ethernet, near field communication, etc.) for facilitating communication among the vehicle 102, the remote computing device 104 the user device 106, and/or other devices. As such, communication among these devices may include an intermediary device and/or may be a direct communication between the two endpoint devices.

The vehicle 102 may include a vehicle head unit 120. The vehicle head unit 120 may include a display device 204 (depicted in FIG. 2), a vehicle computing device 130, and/or other components for providing infotainment and/or other vehicle services, such as an antenna, radio receiver, navigation system, etc. The vehicle computing device 130 may include a memory component 140, which may store interface logic 144a, telematics logic 144b, and/or other logic. As described in more detail below, the interface logic 144a, when executed by a processor, may be configured to cause the vehicle head unit 120 to provide one or more user interfaces. The telematics logic 144b may be configured to cause the vehicle to register for a vehicle telematics service and/or utilize the vehicle telematics service.

The remote computing device 104 may be configured as a server, personal computer, tablet, laptop, mobile device, and/or other computing device, etc. for providing the functionality described herein. As an example, the remote computing device 104 may be configured as a data communications module and/or TSP for registering the vehicle 102, other vehicles, registering users for a telematics service, and/or for providing a telematics service to the registered vehicle. Accordingly, the remote computing device 104 may also include a memory component 142, which stores registration logic 144c, communication logic 144d, and/or other logic. The registration logic 144c may be configured to cause the remote computing device 104 to facilitate the registration process for one or more vehicle telematics services, as described herein. The communication logic 144d may be configured to cause the remote computing device 104 to provide the telematics service to the registered vehicles.

Similarly, the user device 106 may be configured as a mobile device, a tablet, a laptop, a personal computer, and/or other device that is associated with a user address. The user address may include a user telephone number, but could be an email address, a social security number, a social media handle, etc., so long as the user address is unique to the particular user and/or is associated with or accessible by the user device 106 to facilitate the registration process described herein. As such, the user device 106 may include a memory component 144, which may store messaging logic 144e, browser logic 144f, and/or other logic. The messaging logic 144e may include an SMS application, an email application, telephone functionality, and/or other logic for sending and/or receiving electronic messages, such as from the remote computing device 104. The browser logic 144f may include an internet browser, an application, and/or other logic for accessing data from the remote computing device 104 (or other external provider) to register the vehicle and/or user, as described herein.

It should be understood that while the vehicle 102, the remote computing device 104, and the user device 106 are depicted in FIG. 1 as each being single devices, this is merely an embodiment. As an example, the remote computing device 104 may represent one or more devices that are utilized to facilitate the functionality described herein that are remote from the vehicle 102 and/or user device 106. In some embodiments, the remote computing device 104 may represent a TSP, a data communications module, and/or a web server that provides a website (or application) to register a vehicle and/or user. Other embodiments are also contemplated.

Figure 2:
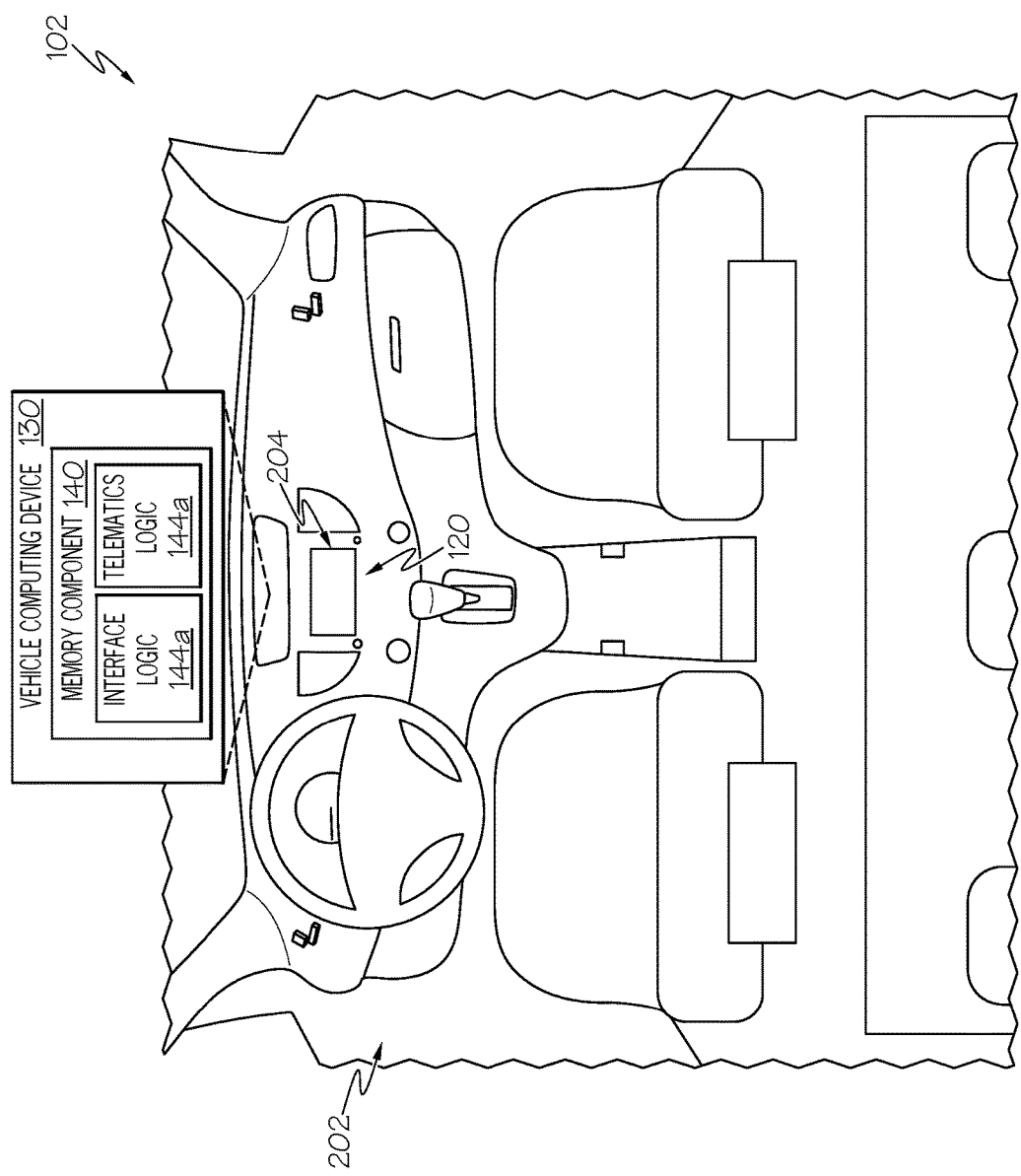
FIG. 2 depicts a vehicle interior for vehicle telematics registration, according to embodiments described herein.

FIG. 2 depicts a vehicle interior 202 for vehicle telematics registration, according to embodiments described herein. As illustrated, the vehicle interior 202 includes the vehicle head unit 120. The vehicle head unit 120 includes the vehicle computing device 130, as well as the display device 204. As described in more detail below, the display device 204 may be configured provide one or more user interfaces associated with registering and/or using a telematics service.

Figure 3:
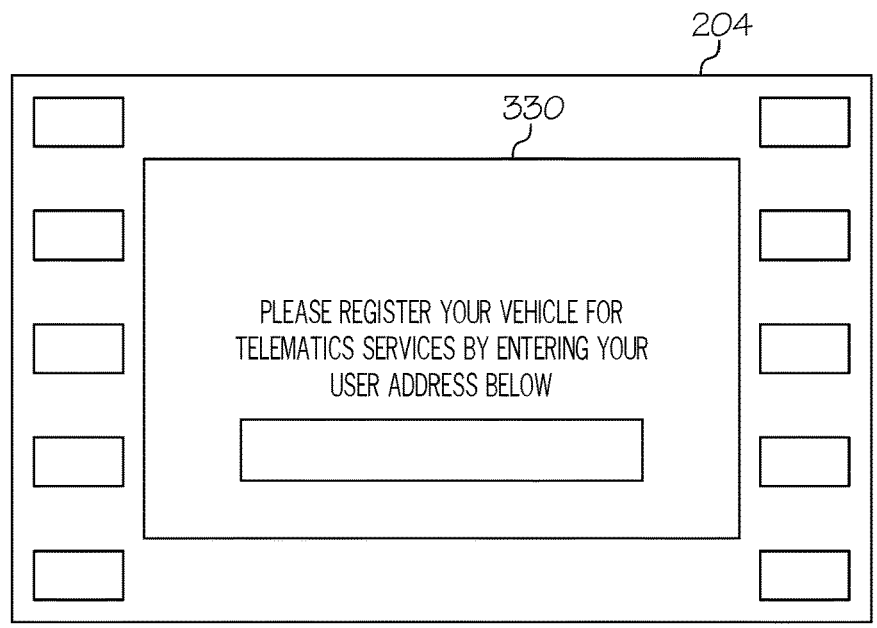
FIG. 3 depicts a user interface provided by a vehicle head unit in vehicle telematics registration, according to embodiments described herein.

FIG. 3 depicts a user interface 330 provided by a vehicle head unit 120 in vehicle telematics registration, according to embodiments described herein. As illustrated, the display device 204 may provide the user interface 330 (also referred to as an address user interface), which requests a user address (such as a user telephone number) to register the vehicle 102 and/or user for the telematics service. Depending on the particular embodiment, the user interface 330 may be provided in response to a user selection on the vehicle head unit 120 and/or automatically in response to a determination that the vehicle 102 has a new user and/or owner.

As an example, when the vehicle 102 is sold, the previous owner may operate the vehicle head unit 120 to remove personal data, including any association with current vehicle telematics services. This may cause the vehicle head unit 120 to display the user interface 330. Similarly, some embodiments may automatically detect a change in owner and/or primary user such as during vehicle service, via a communication with a department of motor vehicles and/or via other mechanisms. Based on this detection, the personal data of previous owner (or primary user) may be removed and/or the user interface 330 may be provided.

Regardless, in response to the user entering the user address into the user interface 330, the vehicle head unit 120 may send the user address, a vehicle identifier (such as a vehicle identification number (VIN), and/or other data to the remote computing device 104. The remote computing device 104 may receive the information from the vehicle head unit 120 and may create an electronic message to the user address for sending to the user device 106.

In some embodiments, the remote computing device 104 may additionally determine whether the user has previously registered a user account with the remote computing device 104. As an example, if the user has a plurality of vehicles under common ownership or operation, a single account may be utilized to provide telematic services to one or more of those vehicles. As such, if the user has an existing user account, the remote computing device 104 may determine that the user account exists and may associate the vehicle 102 with the existing user account. Additionally, a determination is made regarding whether the user has previously identified at least one vehicle telematics service for the vehicle 102 to automatically register. In some embodiments, the remote computing device 104 may additionally authenticate the user prior to associating the vehicle 102 with the user account, as described in more detail below.

Figure 4:
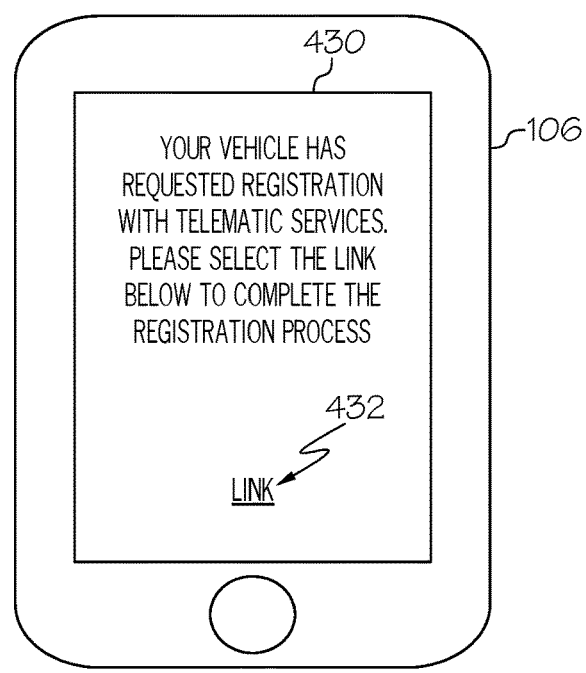
FIG. 4 depicts a user interface provided by a user device for vehicle telematics registration, according to embodiments described herein.

FIG. 4 depicts a user interface 430 provided by a user device 106 for vehicle telematics registration, according to embodiments described herein. As illustrated, the user interface 430 may be provided by the user device 106 and may insert a link 432. The link 432 may be selected by a user to take the user device 106 to a website (and/or launch an application) that provides a registration form to the user for registering for the vehicle telematics services.

As discussed above, the user interface 430 may be received in the form of a short message service (SMS) text message, an email, a push notification, and/or other form of electronic communication. Additionally, while the link 432 may take the form of a link or hyperlink, some embodiments may provide the registration form (depicted in the user interface 530 of FIG. 5) directly within the electronic message.

Figure 5:
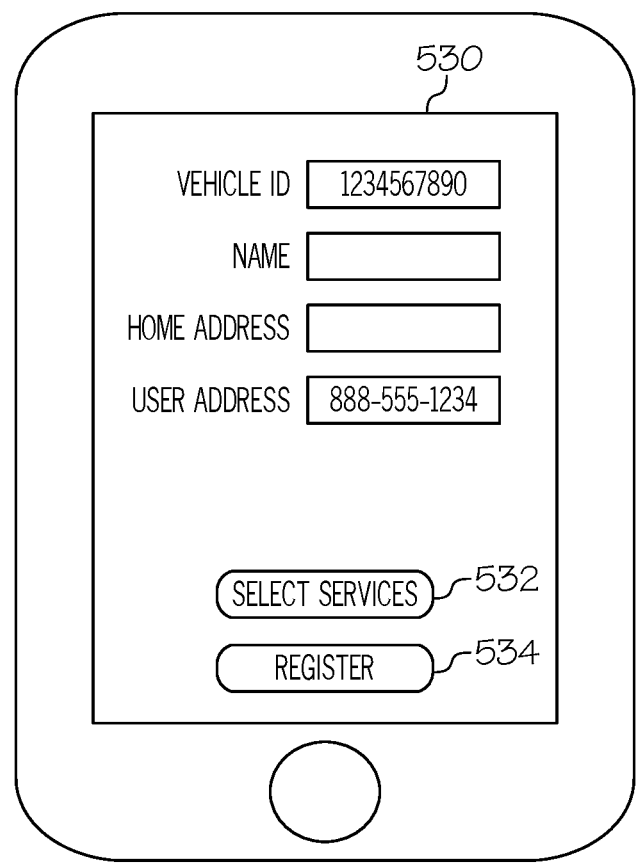
FIG. 5 depicts a user interface for providing a registration form for vehicle telematics registration, according to embodiments described herein.

FIG. 5 depicts a user interface 530 for providing a registration form for vehicle telematics registration, according to embodiments described herein. Specifically, in response to selection of the link 432 from FIG. 4, the user device 106 may launch a website and/or application that provides the user interface 530. The user interface 530 may include a plurality of fields, such as for vehicle identifier, user name, home address, user address, vehicle mileage, etc., with a first portion of the registration form being populated with the information received from the vehicle computing device 130 (e.g., the user address and/or vehicle identifier). The user may populate the remaining fields to complete the vehicle registration.

Additionally, if the remote computing device 104 determines that the user has previously registered a user account, the user interface 530 may instead provide an authentication user interface and/or option for the user to login to his/her account. At that point, the account information and/or previously submitted user data (including the fields provided in FIG. 5) may be provided in a second portion of the user interface 530 such that the user may confirm that the information is correct.

Also provided in the user interface 530 are a select services option 532 and a register option 534. In response to a user selecting the select services option 532, another user interface may be provided for the user to identify which of the plurality of telematics services he/she wishes the vehicle 102 to utilize. In response to selection of the register option 534, the vehicle 102 and/or user may be registered.

It should be understood that, in some embodiments, the remote computing device 104 may determine that the user has not previously registered for a user account. As such, the user interface 530 may additionally provide an option to create a user account by the user submitting additional user information, such as full name, house address, payment information, etc. This allows the user to easily access his/her account to change information and/or vehicle telematics services to which the user subscribes.

It should also be understood that the vehicle head unit 120 and/or user device 106 may be configured to deactivate a subscribed telematics service. As an example, the vehicle head unit 120 may provide an option to deactivate a telematics service or otherwise edit the subscriptions. The vehicle head unit 120 may then receive a deactivation command from the user in response to the user indicating a desire to disassociate the vehicle 102 from the telematics service. The vehicle head unit 120 may additionally report the deactivation command to the remote computing device 104 to disassociate the vehicle 102 from the telematics service.

Figure 6:
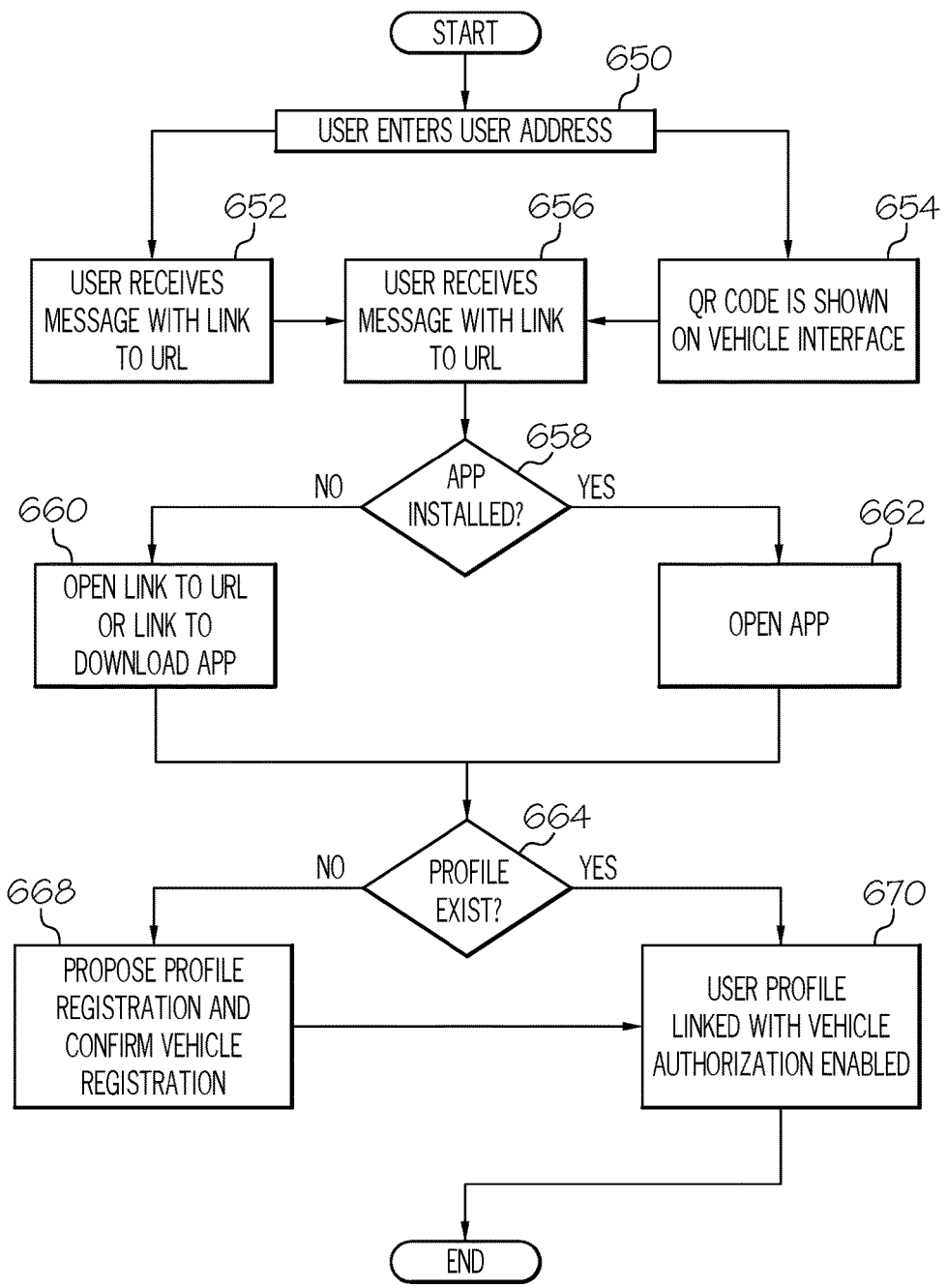
FIG. 6 depicts a flowchart for vehicle telematics registration, according to embodiments described herein.

FIG. 6 depicts a flowchart for vehicle telematics registration, according to embodiments described herein. As illustrated in block 650, a user interface may be provided by a vehicle head unit 120 and the user may enter a user address. In block 652, the user may receive a message with a link to a uniform resource locator (URL), such as on the user device 106. In block 654, a quick response (QR) code or other code may be provided by the vehicle head unit 120, which the user device 106 can scan to access the URL. In block 656, the user may receive an electronic message with the link to the URL. In block 658, a determination may be made regarding whether the user device 106 includes an application for providing the URL. If not, the process proceeds to block 660, where the link may be opened in a browser and/or a link to download the application may be provided. Alternatively, in block 662, the user device 106 may launch the application.

In block 664, a determination may be made regarding whether the user has already created a user profile or user account. If not, the remote computing device 104 may propose user profile or user account registration and may confirm vehicle registration to the vehicle telematics services. If the profile already exists, in block 670, the user profile or user account may be linked with the vehicle 102 and authorization may be enabled.

Figure 7:
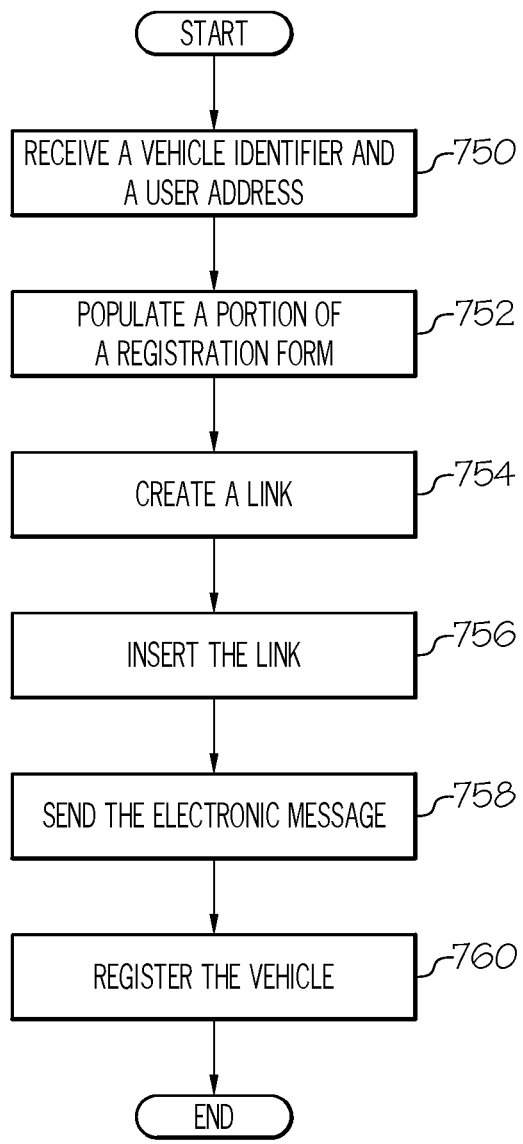
FIG. 7 depicts a flowchart for registering a vehicle for a vehicle telematics service, according to embodiments described herein.

FIG. 7 depicts a flowchart for registering a vehicle 102 for a vehicle telematics service, according to embodiments described herein. As illustrated in block 750, a vehicle identifier and a user address may be received, where the vehicle head unit 120 provided a user interface requesting the user address. In block 752, a portion of a registration form may be populated with the vehicle identifier and the user address. In block 754, a link to a registration form may be created. In block 756, the link may be inserted into an electronic message to the user. In block 758, the electronic message may be sent to the user address. In block 760, the vehicle 102 may be registered in response to the user selecting the link and submitting the registration form.

Figure 8:
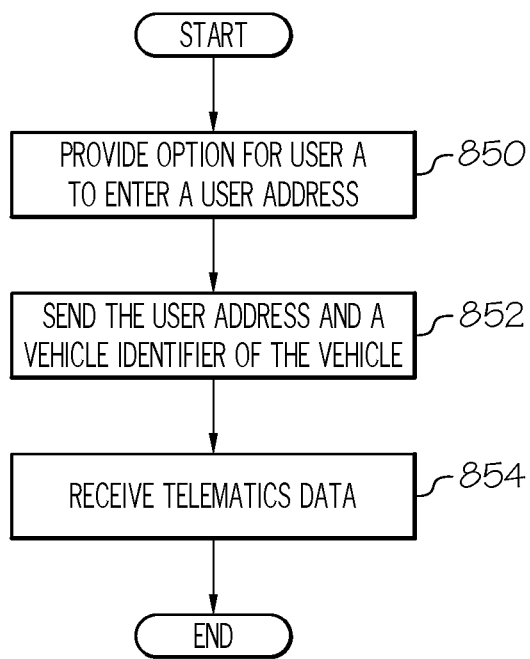
FIG. 8 depicts a flowchart for a vehicle head unit to register a vehicle with a vehicle telematics service, according to embodiments described herein.

FIG. 8 depicts a flowchart for a vehicle head unit 120 to register a vehicle 102 with a vehicle telematics service, according to embodiments described herein. As illustrated in block 850, an address user interface with an option for a user to enter a user address may be provided. The user address may be associated with a user device 106 of the user. In block 852, the user address and the vehicle identifier of the vehicle 102 may be sent to the remote computing device 104. In response to receiving the user address and the vehicle identifier, the remote computing device 104 may send an electronic message to the user device 106, where the electronic message includes a link for the user to register the vehicle 102 with a telematics service. In block 854, telematics data may be received from the remote computing device 104, where the remote computing device 104 sends the telematics data in response to receiving the registration data submitted via the user device 106 and where the telematics data is associated with the telematics service to which the vehicle 102 is registered.

Figure 9:
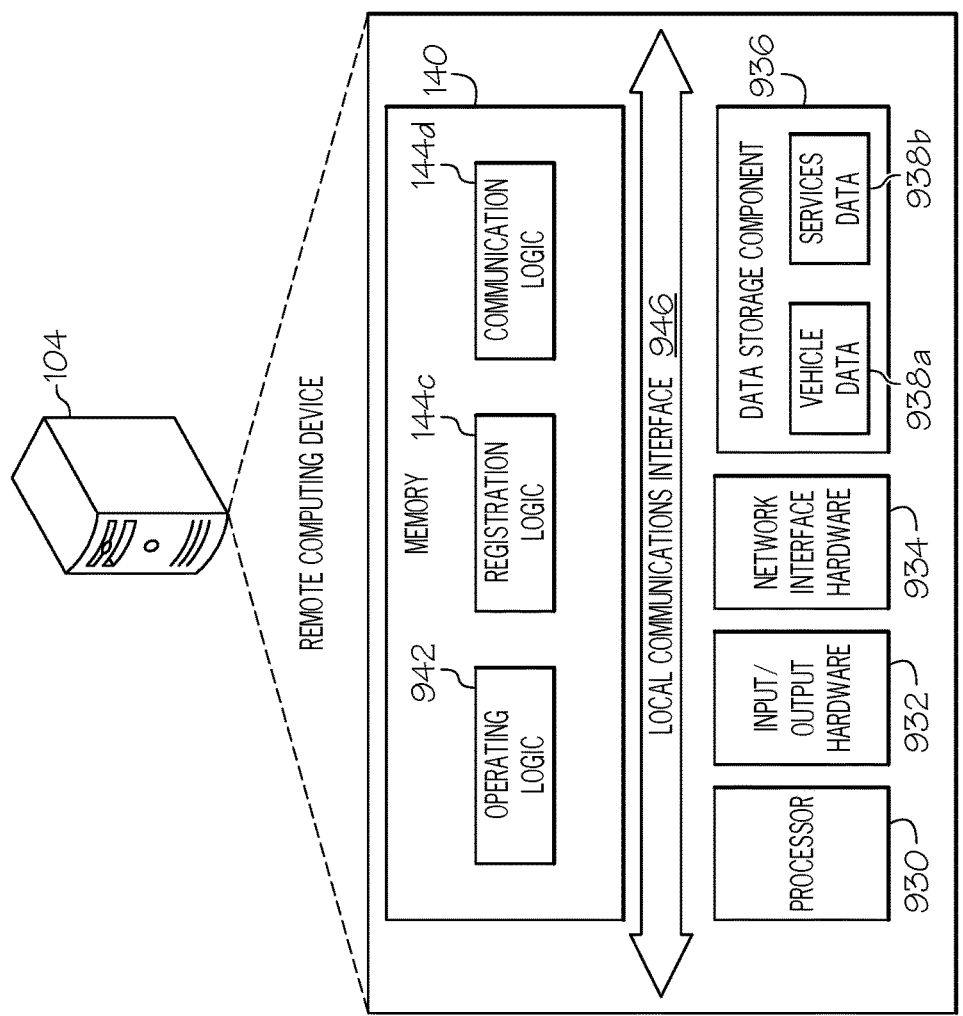
FIG. 9 depicts a remote computing device for vehicle telematics registration, according to embodiments described herein.

FIG. 9 depicts a remote computing device 104 for vehicle telematics registration, according to embodiments described herein. The remote computing device 104 includes a processor 930, input/output hardware 932, the network interface hardware 934, a data storage component 936 (which stores vehicle data 938a, services data 938b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 104 and/or external to the remote computing device 104.

The memory component 140 may store operating logic 942, the registration logic 144c and the communication logic 144d. The registration logic 144c and the communication logic 144d may each include a plurality of different pieces of logic, each of which may be embodied as a computer program, firmware, and/or hardware, as an example. A local communications interface 946 is also included in FIG. 9 and may be implemented as a bus or other communication interface to facilitate communication among the components of the remote computing device 104.

The processor 930 may include any processing component operable to receive and execute instructions (such as from a data storage component 936 and/or the memory component 140). As described above, the input/output hardware 932 may include and/or be configured to interface with the components of the vehicle 102, such as the vehicle head unit 120, the sensors, the motors, etc.

The network interface hardware 934 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the remote computing device 104 and other computing devices, such as a mobile device, a server, etc.

The operating logic 942 may include an operating system and/or other software for managing components of the remote computing device 104. As also discussed above, the registration logic 144c may reside in the memory component 140 and may be configured to cause the processor 930 to register the vehicle 102 (or plurality of vehicles) for a telematics service. Similarly, the communication logic 144d may be utilized to communicate with the vehicle head unit 120 and/or the user device 106, as described herein.

It should be understood that while the components in FIG. 9 are illustrated as residing within the remote computing device 104, this is merely an example. In some embodiments, one or more of the components may reside external to the remote computing device 104. It should also be understood that, while the remote computing device 104 is illustrated as a single device, this is also merely an example. In some embodiments, the registration logic 144c and the communication logic 144d may reside on different computing devices. As an example, one or more of the functionality and/or components described herein may be provided by the vehicle computing device 130, the user device 106, and/or other device, which may be coupled to the remote computing device 104 via the network 100.

Additionally, while the remote computing device 104 is illustrated with the registration logic 144c and the communication logic 144d as separate logical components, this is also an example. In some embodiments, a single piece of logic may cause the remote computing device 104 to provide the described functionality.

As illustrated above, various embodiments for vehicle telematics registration are disclosed. These embodiments allow the user to more easily electronically register the user or vehicle for telematics by the vehicle head unit providing a user interface to receive the user's telephone number. This streamlines the electronic registration process, thereby increasing the number of registered users and vehicles. Additionally, embodiments described herein solve a problem that is inherent in the computing world. Specifically, vehicle telematics is inherently a computerized service, which did not exist prior to networking and computing in general. As such, online registration of a vehicle for a telematics service is also an inherently computing solution that overcomes significant difficulties in the art.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for vehicle telematics registration. It should also be understood that these embodiments are merely exemplary and are not intended to limit the scope of this disclosure.

What is claimed is:

1. A method for vehicle telematics registration comprising:
   receiving, by a computing device, a vehicle identifier for a vehicle and a user telephone number for a user from a vehicle head unit, wherein the vehicle head unit provided a user interface requesting the user telephone number;
   populating, by the computing device, a portion of a registration form for a telematics service with the vehicle identifier and the user telephone number;
   creating, by the computing device, a link to the registration form;
   inserting, by the computing device, the link into an electronic message to the user telephone number;
   sending, by the computing device, the electronic message to the user telephone number; and
   registering, by the computing device, the vehicle for the telematics service in response to the user selecting the link and submitting the registration form.

2. The method of claim 1, further comprising:
- determining whether the user has previously registered a user account; and
- in response to determining that the user has previously registered the user account, associating the vehicle identifier with the user account.

3. The method of claim 2, wherein in response to receiving the user telephone number and determining that the user has previously registered the user account, the method further comprising authenticating the user prior to associating the vehicle with the user account.

4. The method of claim 1, wherein an option to select from a plurality of telematics services is provided to the user.

5. The method of claim 1, further comprising receiving additional user information from the user on the registration form, wherein at least a portion of the additional user information is utilized to create a user account for the user, wherein the user account is associated with the vehicle.

6. The method of claim 1, further comprising receiving a deactivation command from the user, in response to the user indicating a desire to disassociate the vehicle from the telematics service, wherein the user indicates the desire to disassociate via at least one of the following: a mobile device or the vehicle head unit.

7. The method of claim 1, further comprising providing the telematics service to the vehicle.

8. A system for vehicle telematics registration comprising
- a remote computing device that includes a memory component that stores logic that, when executed by the remote computing device, causes the system to perform at least the following:
- receive a vehicle identifier for a vehicle and a user address of a user from a vehicle head unit;
- determine, from the user address, whether the user has previously registered;
- in response to a determination that the user has not previously registered, populate a first portion of a registration form for a telematics service with the vehicle identifier and the user address;
- in response to a determination that the user has previously registered, populate the first portion of the registration form with the vehicle identifier and the user address and populate a second portion of the registration form with previously submitted user data;
- create a link to the registration form;
- insert the link into an electronic message to the user address;
- send the electronic message to the user address; and
- register the vehicle for the telematics service in response to the user selecting the link and submitting the registration form.

9. The system of claim 8, further comprising the vehicle that includes the vehicle head unit, wherein the vehicle head unit provides a user interface to the user for submitting the user address.

10. The system of claim 8, wherein the user address is linked with a mobile device of the user, such that the mobile device receives the link and provides a user interface for the user to submit the registration form.

11. The system of claim 8, wherein an option to select from a plurality of telematics services is provided to the user.

12. The system of claim 8, wherein the logic further causes the system to receive a deactivation command from the user, in response to the user indicating a desire to disassociate the vehicle from the telematics service, wherein the user indicates the desire to disassociate via at least one of the following: a mobile device or the vehicle head unit.

13. The system of claim 8, wherein the logic further causes the system to provide the telematics service to the vehicle.

14. The system of claim 8, wherein in response to receiving the user address and determining that the user has previously registered a user account, the logic causes the system to authenticate the user prior to associating the vehicle with the user account.

15. A vehicle for vehicle telematics registration comprising
- a vehicle head unit that includes a display device and memory component that stores logic, that when executed by the vehicle head unit causes the vehicle to perform at least the following:
- provide, via the display device, an address user interface with an option for a user to enter a user address, wherein the user address is associated with a user device of the user;
- send the user address and a vehicle identifier of the vehicle to a remote computing device, wherein in response to receiving the user address and the vehicle identifier, the remote computing device sends an electronic message to the user device, wherein the electronic message includes a link for the user to register the vehicle with a telematics service; and
- receive telematics data from the remote computing device, wherein the remote computing device sends the telematics data in response to receiving registration data submitted via the user device, and wherein the telematics data is associated with the telematics service to which the vehicle is registered.

16. The vehicle of claim 15, wherein the remote computing device further receives additional user information from the user when registering the vehicle, wherein at least a portion of the additional user information is utilized to create a user account for the user, wherein the user account is associated with the vehicle.

17. The vehicle of claim 15, wherein the logic further causes the vehicle head unit to perform the following:
- receive a deactivation command from the user, in response to the user indicating a desire to disassociate the vehicle from the telematics service; and
- report the deactivation command to the remote computing device to disassociate the vehicle from the telematics service.

18. The vehicle of claim 15, wherein the logic further causes the vehicle head unit to provide, via the display device, an option to associate the vehicle with any of a plurality of telematics services.

19. The vehicle of claim 15, in response to receiving the user address and the vehicle identifier, the remote computing device determines whether the user has previously registered a user account and, in response to the remote computing device determining that the user has previously registered for the user account, the remote computing device sends data for authenticating the user to the vehicle head unit, which receives the data for authenticating the user and provides an authentication user interface for authenticating the user via the display device.

20. The vehicle of claim 19, wherein, in response to determining that the user has previously registered the user account, a determination is made regarding whether the user has previously identified at least one vehicle telematics services for other vehicles and the vehicle is automatically registered for the at least one vehicle telematics service.

* * * * *